US010597791B2

(12) United States Patent
Sadamori et al.

(10) Patent No.: US 10,597,791 B2
(45) Date of Patent: Mar. 24, 2020

(54) SILVER-PLATED PRODUCT AND METHOD FOR PRODUCING SAME

(71) Applicant: DOWA METALTECH CO., LTD., Tokyo (JP)

(72) Inventors: Shunki Sadamori, Saitama (JP); Hiroshi Miyazawa, Saitama (JP); Masafumi Ogata, Saitama (JP); Keisuke Shinohara, Saitama (JP)

(73) Assignee: DOWA METALTECH CO., LTD., Tokyo (JP)

( * ) Notice: Subject to any disclaimer, the term of this patent is extended or adjusted under 35 U.S.C. 154(b) by 196 days.

(21) Appl. No.: 15/034,320

(22) PCT Filed: Oct. 31, 2014

(86) PCT No.: PCT/JP2014/079656
§ 371 (c)(1),
(2) Date: May 4, 2016

(87) PCT Pub. No.: WO2015/068825
PCT Pub. Date: May 14, 2015

(65) Prior Publication Data

US 2016/0265127 A1 Sep. 15, 2016

(30) Foreign Application Priority Data

Nov. 8, 2013 (JP) ................................ 2013-231739
Oct. 29, 2014 (JP) ................................ 2014-219858

(51) Int. Cl.
*B32B 15/01* (2006.01)
*H01H 1/02* (2006.01)
(Continued)

(52) U.S. Cl.
CPC ................ *C25D 3/46* (2013.01); *C25D 3/12* (2013.01); *C25D 5/12* (2013.01); *C25D 5/34* (2013.01);
(Continued)

(58) Field of Classification Search
None
See application file for complete search history.

(56) References Cited

U.S. PATENT DOCUMENTS 3,215,610 A 11/1965 Skaliks
3,580,821 A 5/1971 Todt et al.
(Continued)

FOREIGN PATENT DOCUMENTS

JP 2006307277 A 11/2006
JP 2008169408 A 7/2008
(Continued)

OTHER PUBLICATIONS

English machine translation of JP 2013-249514, EPO, accessed Apr. 5, 2018.*
(Continued)

*Primary Examiner* — Humera N Sheikh
*Assistant Examiner* — Xiaobei Wang
(74) *Attorney, Agent, or Firm* — Bachman & LaPointe, PC

(57) ABSTRACT

A silver-plated product, wherein the preferred orientation plane of a surface layer of silver is {111} plane and wherein the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5, is produced by forming the surface layer on a base material by electroplating at a liquid temperature of 12 to
(Continued)

24° C. and a current density of 3 to 8 A/dm$^2$ in a silver plating solution which contains 80 to 110 g/L of silver, 70 to 160 g/L of potassium cyanide and 55 to 70 mg/L of selenium, so as to cause the product of the concentration of potassium cyanide and the current density to be 840 g·A/L·dm$^2$ or less.

8 Claims, 1 Drawing Sheet

(51) Int. Cl.

| | |
|---|---|
| ***H01R 13/03*** | (2006.01) |
| ***C25D 3/46*** | (2006.01) |
| ***C25D 3/12*** | (2006.01) |
| ***C25D 5/12*** | (2006.01) |
| ***C25D 5/34*** | (2006.01) |
| ***C25D 17/10*** | (2006.01) |
| ***C25D 17/12*** | (2006.01) |
| ***C25D 5/50*** | (2006.01) |
| ***C25F 1/00*** | (2006.01) |
| *C25D 7/00* | (2006.01) |
| *H01B 1/02* | (2006.01) |
| *C25D 7/06* | (2006.01) |

(52) U.S. Cl.

CPC ............... *C25D 5/50* (2013.01); *C25D 17/10* (2013.01); *C25D 17/12* (2013.01); *C25F 1/00* (2013.01); *H01H 1/02* (2013.01); *H01R 13/03* (2013.01); *C25D 7/00* (2013.01); *C25D 7/0614* (2013.01); *H01B 1/02* (2013.01)

(56) References Cited

U.S. PATENT DOCUMENTS

| | | | | |
|---|---|---|---|---|
| 4,155,817 A | 5/1979 | Fletcher et al. | | |
| 2015/0037608 A1* | 2/2015 | Shinohara | ............. | H01R 13/03<br>428/673 |

FOREIGN PATENT DOCUMENTS

| | | | |
|---|---|---|---|
| JP | 2009079250 A | | 4/2009 |
| JP | 2012162775 A | | 8/2012 |
| JP | 2013-249514 | * | 12/2013 |
| WO | 2013137121 A1 | | 9/2013 |
| WO | 2014148200 A1 | | 9/2014 |

OTHER PUBLICATIONS

Myers, Marjorie, Overview of the Use of Silver in Connector Applications, Tyco Electronics, 503-1016 Rev. O, Feb. 5, 2009. (Year: 2009).*

Giumlia-Mair et al., “Metallurgy: Understanding How, Learning Why”, INSTAP Academic Press, 2011, p. 16 (Year: 2011).*

International Search Report for PCT/JP2014/079656 dated Jan. 26, 2015.

European Search Report for Apln. No. 14 859 853.5 dated Jul. 5, 2017.

* cited by examiner

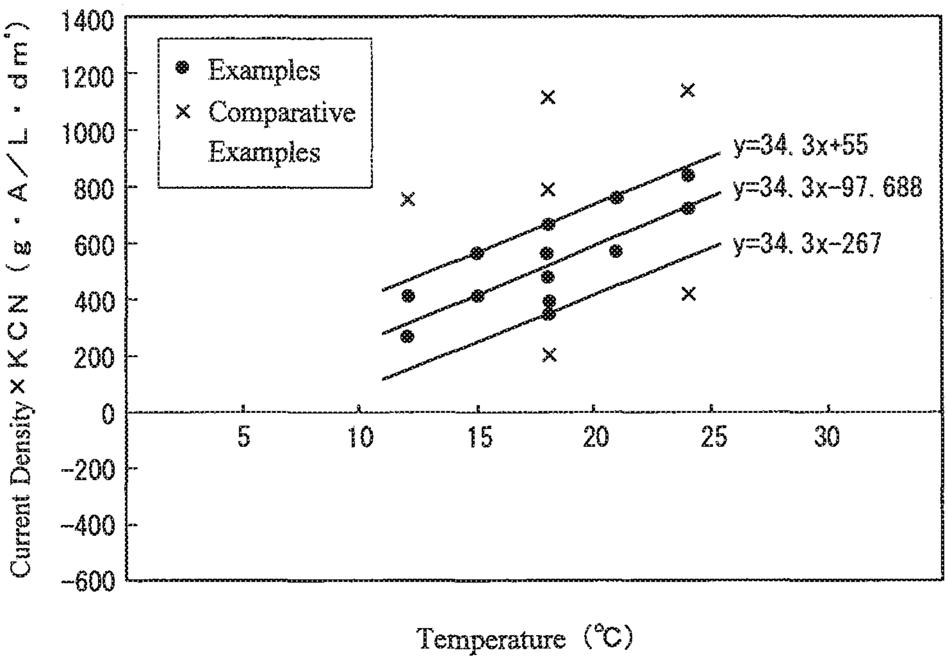
Current Density × KCN (g・A／L・dm³)
1400
1200
1000
800
600
400
200
0
-200
-400
-600
5
10
15
20
25
30
Examples
Comparative Examples
y=34. 3x+55
y=34. 3x-97. 688
y=34. 3x-267
Temperature (°C)

SILVER-PLATED PRODUCT AND METHOD FOR PRODUCING SAME

TECHNICAL FIELD

The present invention generally relates to a silver-plated product and a method for producing the same. More specifically, the invention relates to a silver-plated product used as the material of contact and terminal parts, such as connectors, switches and relays, which are used for on-vehicle and/or household electric wiring, and a method for producing the same.

BACKGROUND ART

As conventional materials of contact and terminal parts, such as connectors and switches, there are used plated products wherein a base material of copper, a copper alloy, stainless steel or the like, which is relatively inexpensive and which has excellent corrosion resistance, mechanical characteristics and so forth, is plated with tin, silver, gold or the like in accordance with required characteristics, such as electrical and soldering characteristics.

Tin-plated products obtained by plating a base material of copper, a copper alloy, stainless steel or the like, with tin are inexpensive, but they do not have good corrosion resistance in a high-temperature environment. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

The materials of contact and terminal parts, such as connectors and switches, are required to have good wear resistance against the insertion and extraction of connectors or the sliding movements of switches.

However, in silver-plated products, there is a problem in that the crystal grains of the silver plating film are easily increased by recrystallization, the increase of the crystal grains decreasing the hardness of the silver plating film to deteriorate the wear resistance thereof (see, e.g., Japanese Patent Laid-Open No. 2008-169408).

As a method for improving the wear resistance of such silver-plated products, there is known a method for improving the hardness of a silver-plated product by causing an element, such as antimony, to be contained in the silver plating film (see, e.g., Japanese Patent Laid-Open No. 2009-79250).

However, if an element, such as antimony, is contained in the silver plating film, there is a problem in that the contact resistance of the silver plating film is increased since the purity of silver is lowered although silver is alloyed to improve the hardness of the silver plating film.

DISCLOSURE OF THE INVENTION

It is therefore an object of the present invention to eliminate the above-described conventional problems and to provide a silver-plated product, which can prevent the increase of the contact resistance thereof while maintaining the high hardness thereof, and a method for producing the same.

In order to accomplish the aforementioned object, the inventors have diligently studied and found that it is possible to produce a silver-plated product, which can prevent the increase of the contact resistance thereof while maintaining the high hardness thereof, if the surface layer of silver formed on a base material of the silver-plated product has a preferred orientation plane which is {111} plane and if the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5. Thus, the inventors have made the present invention.

According to the present invention, there is provided a silver-plated product comprising: a base material; and a surface layer of silver which is formed on the base material, wherein the surface layer has a preferred orientation plane which is {111} plane, and the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5. This silver-plate product preferably has a reflection density of not less than 1.0. The silver-plated product preferably has a Vickers hardness Hv of not less than 100, and preferably has a Vickers hardness Hv of not less than 100 after heating the silver-plated product at 50° C. for 168 hours. The base material is preferably made of copper or a copper alloy. The surface layer preferably has a thickness of 2 to 10 μm. The silver-plated product preferably has an underlying layer of nickel formed between the base material and the surface layer.

According to the present invention, there is provided a contact or terminal part which is made of the above-described silver-plated product.

According to the present invention, it is possible to provide a silver-plated product, which can prevent the increase of the contact resistance thereof while maintaining the high hardness thereof, and a method for producing the same.

BRIEF DESCRIPTION OF THE DRAWINGS

FIG. 1 is a graph showing the relationship between a liquid temperature and the product of the concentration of potassium cyanide in a silver plating solution and a current density when each of the silver-plated products in examples and comparative examples is produced in the silver plating solution which contains 80 to 110 g/L of silver, 70 to 160 g/L of potassium cyanide and 55 to 70 mg/L of selenium.

BEST MODE FOR CARRYING OUT THE INVENTION

In the preferred embodiment of a silver-plated product according to the present invention, a surface layer of silver is formed on a base material, wherein the surface layer has a preferred orientation plane which is {111} plane, and the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5 (preferably not less than 0.7, more preferably not less than 0.8). Thus, if the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5, it is possible to prevent recrystallization, so that it is possible to prevent the contact resistance of the silver-plated product from being increased while maintaining the high hardness thereof.

This silver-plate product preferably has a reflection density of not less than 1.0, and more preferably has a reflection density of not less than 1.2. The silver-plated product preferably has a Vickers hardness Hv of not less than 100, more preferably has a Vickers hardness Hv of not less than 110, and most preferably has a Vickers hardness Hv of not less than 120. After the silver-plated product is heated at 50° C. for 168 hours as a heat-proof test, the silver-plated product preferably has a Vickers hardness Hv of not less than 100, more preferably has a Vickers hardness Hv of not less than 110, and most preferably has a Vickers hardness Hv of not less than 120. If the silver-plated product thus has a reflection density of not less than 1.0 and a Vickers hardness Hv of not less than 100, it is difficult to allow the silver-plated product to have defects and/or scratches, so that the silver-plated product can have a good wear resistance. Furthermore, the reflection density of about 2.0 or less is sufficient, and the Vickers hardness Hv of about 160 or less is sufficient before and after the heat-proof test. The base material is preferably made of copper or a copper alloy. If the surface layer is too thick, the costs of the silver-plated product are not only high, but the silver-plated product is also easily broken, so that the workability of the silver-plated product is deteriorated. If the surface layer is too thin, the wear resistance of the silver-plated product is deteriorated. Therefore, the thickness of the surface layer is preferably in the range of from 2 μm to 10 μm, more preferably in the range of from 3 μm to 7 μm, and most preferably in the range of from 4 μm to 6 μm. In order to improve the adhesion of the surface layer of silver to the base material, an underlying layer of nickel is preferably formed between the base material and the surface layer. If the underlying layer is too thin, the improvement of the adhesion of the surface layer of silver to the base material is not sufficient. If the underlying layer is too thick, the workability of the silver-plated product is deteriorated. Therefore, the thickness of the underlying layer is preferably in the range of from 0.5 μm to 2.0 μm. In order to improve the adhesion of the surface layer of silver to the underlying layer, an intermediate layer may be formed between the underlying layer and the surface layer by silver strike plating. In order to prevent the contact resistance of the silver-plated product from being increased, the purity of Ag in the surface layer is preferably 99% by weight or more, and more specifically 99.5% by weight or more.

Such a silver-plated product can be produced by forming a surface layer of silver on the surface of a base material or on the surface of an underlying layer formed on the base material, by electroplating at a predetermined liquid temperature and a predetermined current density in a silver plating solution which contains 80 to 110 g/L of silver, 70 to 160 g/L of potassium cyanide and 55 to 70 mg/L of selenium. Specifically, if the relationship between the liquid temperatures and the products of the concentrations of potassium cyanide and the current densities is within a predetermined range described in examples, which will be described below, in a liquid temperature range of 12 to 24° C. and a current density range of 3 to 8 A/dm$^2$, it is possible to produce a silver-plated product wherein a surface layer of silver is formed on a base material, the surface layer having a preferred orientation plane which is {111} plane, and wherein the ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5.

In this method for producing a silver-plated product, the silver plating solution is preferably an aqueous silver plating solution which contains silver potassium cyanide ($KAg(CN)_2$), potassium cyanide (KCN) and potassium selenocyanate (KSeCN).

Examples of a silver-plated product and a method for producing the same according to the present invention will be described below in detail.

Example 1

First, a rolled sheet of a pure copper having a size of 67 mm×50 mm×0.3 mm was prepared as a base material (a material to be plated). The material and a SUS plate were put in an alkali degreasing solution to be used as a cathode and an anode, respectively, to carry out electrolytic degreasing at 5 V for 30 seconds. The material thus electrolytic-degreased was washed for 15 seconds, and then, pickled for 15 seconds in a 3% sulfuric acid and washed for 15 seconds.

Then, the material thus processed and a nickel electrode plate were used as a cathode and an anode, respectively, to electroplate (dull-nickel-plate) the material at a current density of 5 A/dm$^2$ for 85 seconds in an aqueous dull nickel plating solution containing 25 g/L of nickel chloride, 35 g/L of boric acid and 540 g/L of nickel sulfamate tetrahydrate, while stirring the solution at 500 rpm by a stirrer. After a dull nickel plating film having a thickness of 1 μm was thus formed, the nickel-plated material was washed for 15 seconds.

Then, the nickel-plated material and a titanium electrode plate coated with platinum were used as a cathode and an anode, respectively, to electroplate (silver-strike-plate) the material at a current density of 2 A/dm$^2$ for 10 seconds in an aqueous silver strike plating solution containing 3 g/L of silver potassium cyanide and 90 g/L of potassium cyanide, while stirring the solution at 500 rpm by a stirrer, and then, the silver-strike-plated material was washed for 15 seconds.

Then, the silver-strike-plated material and a silver electrode plate were used as a cathode and an anode, respectively, to electroplate (silver-plate) the material at a current density of 5 A/dm$^2$ and a liquid temperature of 18° C. in an aqueous silver plating solution containing 148 g/L of silver potassium cyanide ($KAg(CN)_2$), 70 g/L of potassium cyanide (KCN) and 109 mg/L of potassium selenocyanate (KSeCN), while stirring the solution at 500 rpm by a stirrer, until a silver plating film having a thickness of 5 μm was formed, and then, the silver-plated material was washed for 15 seconds and dried with wind pressure by an air gun. Furthermore, in the used silver plating solution, the concentration of Ag was 80 g/L, the concentration of KCN was 70 g/L, and the concentration of Se was 60 mg/L, so that the product of the concentration of KCN and the current density was 350 g·A/L·dm$^2$.

With respect to the silver-plated product thus obtained, the Vickers hardness Hv thereof was measured, and the crystal orientation of the silver plating film was evaluated.

The Vickers hardness Hv of the silver-plated product was measured in accordance with JIS Z2244 by applying a measuring load of 10 gf for 10 seconds using a micro-hardness testing machine (HM-221 produced by Mitutoyo Corporation). As a result, the Vickers hardness Hv was 132.

In order to evaluate the crystal orientation of the silver plating film of the silver-plated product, an X-ray diffractometer (XRD) (Full-Automatic Multi-Purpose Horizontal X-ray diffractometer, Smart Lab produced by RIGAKU Corporation) was used for obtaining an X-ray diffraction pattern by carrying out the 2θ/θ scan using an X-ray tube of Cu and the K β filter method. Then, from the X-ray diffraction pattern thus obtained, each of X-ray diffraction peak intensities (intensities of X-ray diffraction peaks) on {111}, {200}, {220} and {311} planes of the silver plating film was divided by a corresponding one of relative intensity ratios (relative intensity ratios in the measurement of powder) ({111}: {200}:{220}:{311}=100:40:25:26) described on JCPD card No. 40783, to obtain a corresponding one of corrected values (corrected intensities). Then, the plane orientation of one of the X-ray diffraction peaks having the highest corrected value (the highest corrected intensity) was evaluated as the direction of the crystal orientation (the preferred orientation plane) of the silver plating film. As a result, the crystals of the silver plating film were orientated to {111} plane (orientated so that {111} plane was directed to the surface (plate surface) of the silver-plated product), i.e., the preferred orientation plane of the silver plating film was {111} plane.

The percentage of the corrected intensity of the X-ray diffraction peak on the preferred orientation plane (the ratio of the X-ray diffraction peak intensity on the preferred orientation plane) to the sum of the correction intensities of the X-ray diffraction peaks on {111}, {200}, {220} and {311} planes of the silver-plated product was calculated. As a result, the ratio of the X-ray diffraction peak intensity on the preferred orientation plane was 55.0%.

From the obtained X-ray diffraction pattern, the full-width at half maximum of the X-ray diffraction peak on {111} plane was calculated. As a result, the full-width at half maximum of the X-ray diffraction peak on {111} plane was 0.259°.

After there was carried out a heat-proof test in which the obtained silver-plated product was heated at 50° C. for 168 hours (1 week) in the atmosphere by means of a dryer (OF450 produced by AS ONE Corporation), the Vickers hardness Hv thereof was measured by the same method as the above-described method, and the crystal orientation of the silver plating film was evaluated by the same method as the above-described method. As a result, the Vickers hardness Hv was 140, and the preferred orientation plane was {111} plane. The ratio of the X-ray diffraction peak intensity on the preferred orientation plane was 55.8%. The full-width at half maximum of the X-ray diffraction peak on {111} plane was 0.217°. The ratio of the full-width at half maximum of the X-ray diffraction peak on {111} plane after the heat-proof test to the full-width at half maximum of the X-ray diffraction peak on {111} plane before the heat-proof test was 0.84.

The contact resistance of the obtained silver-plated product was measured when a silver-plated product indented in a semi-spherical shape of R=1 mm was slid on the obtained silver-plated product at a sliding speed of 100 mm/min by a sliding distance of 5 mm once while the indented silver-plated product was pressed against the obtained silver-plated product at a load of 300 gf by means of an electrical contact simulator (CRS-1 produced by Yamasaki-Seiki Co., Ltd.). As a result, the contact resistance of the silver-plated product was a low value of 0.24 mΩ.

As the glossiness of the silver-plated product, the reflection density of the silver-plated product was measured in parallel to the rolling direction of the base material by means of a densitometer (Densitometer ND-1 produced by NIPPON DENSHOKU INDUSTRIES Co., LTD.). As a result, the reflection density of the silver-plated product was 1.69.

After there was carried out a sliding test in which a silver-plated product indented in a semi-spherical shape of R=1 mm was slid on the obtained silver-plated product at a sliding speed of 100 mm/min by a sliding distance of 5 mm to be repeated fifty times of reciprocating motions while the indented silver-plated product was pressed against the obtained silver-plated product at a load of 300 gf by means of an electrical contact simulator (CRS-1 produced by Yamasaki-Seiki Co., Ltd.), the cross-sectional profile of sliding scratches of the silver-plated product (shaved by sliding) was analyzed by means of a laser microscope (VK-9710 produced by KEYENCE CORPORATION), and the cross-sectional area of the sliding scratches was calculated from the width and depth of the sliding scratches as the abrasion loss of the silver plating film. As a result, the abrasion loss of the silver plating film was 260 $\mu m^2$, so that the wear resistance of the silver-plated product was good.

After the silver plating film of the silver-plated product was dissolved in nitric acid to be liquefied, the concentration of the solution thus obtained was adjusted, and then, an inductively coupled plasma (ICP) atomic emission spectrometric analyzer (ICP-OES) (SPS5100 produced by Seiko Instruments Inc.) was used for obtaining the purity of Ag by plasma atomic emission spectroscopy. As a result, the purity of Ag was 99.9% by weight or more.

Example 2

A silver-plated product was produced by the same method as that in Example 1, except that the electroplating (silver-plating) was carried out at a current density of 3 $A/dm^2$ in an aqueous silver plating solution containing 148 g/L of silver potassium cyanide, 130 g/L of potassium cyanide and 109 mg/L of potassium selenocyanate. Furthermore, in the used silver plating solution, the concentration of Ag was 80 g/L, the concentration of KCN was 130 g/L, and the concentration of Se was 60 mg/L, so that the product of the concentration of KCN and the current density was 390 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 126, and the preferred orientation plane was {111} plane. The ratio of the X-ray diffraction peak intensity on the preferred orientation plane was 60.6%, and the full-width at half maximum of the X-ray diffraction peak on {111} plane was 0.260°.

By the same methods as those in Example 1, after the heat-proof test was carried out, the Vickers hardness Hv thereof was measured, and the crystal orientation of the silver plating film was evaluated. As a result, the Vickers hardness Hv was 132, and the preferred orientation plane was {111} plane. The ratio of the X-ray diffraction peak intensity on the preferred orientation plane was 60.7%. The full-width at half maximum of the X-ray diffraction peak on {111} plane was 0.217°. The ratio of the full-width at half maximum of the X-ray diffraction peak on {111} plane after the heat-proof test to the full-width at half maximum of the X-ray diffraction peak on {111} plane before the heat-proof test was 0.83.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.05 mΩ. The reflection density of the silver-plated product was 1.54, so that the glossiness of the silver-plated product was good. The abrasion loss of the silver plating film was 309 $\mu m^2$, so that the wear resistance of the silver-plated product was good. The purity of Ag was 99.9% by weight or more.

Example 3

A silver-plated product was produced by the same method as that in Example 1, except that the electroplating (silver-plating) was carried out at a current density of 3 $A/dm^2$ in an aqueous silver plating solution containing 148 g/L of silver potassium cyanide, 160 g/L of potassium cyanide and 109 mg/L of potassium selenocyanate. Furthermore, in the used silver plating solution, the concentration of Ag was 80 g/L, the concentration of KCN was 160 g/L, and the concentration of Se was 60 mg/L, so that the product of the concentration of KCN and the current density was 480 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 129, and the preferred orientation plane was {111} plane. The ratio of the X-ray diffraction peak intensity on the preferred orientation plane was 59.9%, and the full-width at half maximum of the X-ray diffraction peak on {111} plane was 0.284°.

By the same methods as those in Example 1, after the heat-proof test was carried out, the Vickers hardness Hv thereof was measured, and the crystal orientation of the silver plating film was evaluated. As a result, the Vickers hardness Hv was 129, and the preferred orientation plane was {111} plane. The ratio of the X-ray diffraction peak intensity on the preferred orientation plane was 61.5%. The full-width at half maximum of the X-ray diffraction peak on {111} plane was 0.231°. The ratio of the full-width at half maximum of the X-ray diffraction peak on {111} plane after the heat-proof test to the full-width at half maximum of the X-ray diffraction peak on {111} plane before the heat-proof test was 0.81.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.18 mΩ. The reflection density of the silver-plated product was 1.36, so that the glossiness of the silver-plated product was good. The abrasion loss of the silver plating film was 250 $\mu m^2$, so that the wear resistance of the silver-plated product was good. The purity of Ag was 99.9% by weight or more.

Example 4

A silver-plated product was produced by the same method as that in Example 1, except that the electroplating (silver-plating) was carried out in an aqueous silver plating solution containing 175 g/L of silver potassium cyanide, 80 g/L of potassium cyanide and 109 mg/L of potassium selenocyanate. Furthermore, in the used silver plating solution, the concentration of Ag was 95 g/L, the concentration of KCN was 80 g/L, and the concentration of Se was 60 mg/L, so that the product of the concentration of KCN and the current density was 400 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 131, and the preferred orientation plane was {111} plane. The ratio of the X-ray diffraction peak intensity on the preferred orientation plane was 63.7%, and the full-width at half maximum of the X-ray diffraction peak on {111} plane was 0.269°.

By the same methods as those in Example 1, after the heat-proof test was carried out, the Vickers hardness Hv thereof was measured, and the crystal orientation of the silver plating film was evaluated. As a result, the Vickers hardness Hv was 134, and the preferred orientation plane was {111} plane. The ratio of the X-ray diffraction peak intensity on the preferred orientation plane was 63.6%. The full-width at half maximum of the X-ray diffraction peak on {111} plane was 0.232°. The ratio of the full-width at half maximum of the X-ray diffraction peak on {111} plane after the heat-proof test to the full-width at half maximum of the X-ray diffraction peak on {111} plane before the heat-proof test was 0.86.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.19 mΩ. The reflection density of the silver-plated product was 1.36, so that the glossiness of the silver-plated product was good. The abrasion loss of the silver plating film was 309 $\mu m^2$, so that the wear resistance of the silver-plated product was good. The purity of Ag was 99.9% by weight or more.

Example 5

A silver-plated product was produced by the same method as that in Example 1, except that the electroplating (silver-plating) was carried out in an aqueous silver plating solution containing 203 g/L of silver potassium cyanide, 80 g/L of potassium cyanide and 109 mg/L of potassium selenocyanate. Furthermore, in the used silver plating solution, the concentration of Ag was 110 g/L, the concentration of KCN was 80 g/L, and the concentration of Se was 60 mg/L, so that the product of the concentration of KCN and the current density was 400 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 130, and the preferred orientation plane was {111} plane. The ratio of the X-ray diffraction peak intensity on the preferred orientation plane was 43.6%, and the full-width at half maximum of the X-ray diffraction peak on {111} plane was 0.231°.

By the same methods as those in Example 1, after the heat-proof test was carried out, the Vickers hardness Hv thereof was measured, and the crystal orientation of the silver plating film was evaluated. As a result, the Vickers hardness Hv was 135, and the preferred orientation plane was {111} plane. The ratio of the X-ray diffraction peak intensity on the preferred orientation plane was 40.4%. The full-width at half maximum of the X-ray diffraction peak on {111} plane was 0.203°. The ratio of the full-width at half maximum of the X-ray diffraction peak on {111} plane after the heat-proof test to the full-width at half maximum of the X-ray diffraction peak on {111} plane before the heat-proof test was 0.88.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.06 mΩ. The reflection density of the silver-plated product was 1.56, so that the glossiness of the silver-plated product was good. The abrasion loss of the silver plating film was 251 μm$^2$, so that the wear resistance of the silver-plated product was good. The purity of Ag was 99.9% by weight or more.

Example 6

A silver-plated product was produced by the same method as that in Example 1, except that the electroplating (silver-plating) was carried out at a liquid temperature of 12° C. and a current density of 4 A/dm$^2$ in an aqueous silver plating solution containing 175 g/L of silver potassium cyanide, 70 g/L of potassium cyanide and 128 mg/L of potassium selenocyanate. Furthermore, in the used silver plating solution, the concentration of Ag was 95 g/L, the concentration of KCN was 70 g/L, and the concentration of Se was 70 mg/L, so that the product of the concentration of KCN and the current density was 280 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 138, and the preferred orientation plane was {111} plane. The ratio of the X-ray diffraction peak intensity on the preferred orientation plane was 61.7%, and the full-width at half maximum of the X-ray diffraction peak on {111} plane was 0.264°.

By the same methods as those in Example 1, after the heat-proof test was carried out, the Vickers hardness Hv thereof was measured, and the crystal orientation of the silver plating film was evaluated. As a result, the Vickers hardness Hv was 145, and the preferred orientation plane was {111} plane. The ratio of the X-ray diffraction peak intensity on the preferred orientation plane was 64.5%. The full-width at half maximum of the X-ray diffraction peak on {111} plane was 0.236°. The ratio of the full-width at half maximum of the X-ray diffraction peak on {111} plane after the heat-proof test to the full-width at half maximum of the X-ray diffraction peak on {111} plane before the heat-proof test was 0.90.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.51 mΩ. The reflection density of the silver-plated product was 1.45, so that the glossiness of the silver-plated product was good. The abrasion loss of the silver plating film was 166 μm$^2$, so that the wear resistance of the silver-plated product was good. The purity of Ag was 99.9% by weight or more.

Example 7

A silver-plated product was produced by the same method as that in Example 1, except that the electroplating (silver-plating) was carried out at a liquid temperature of 12° C. and a current density of 6 A/dm$^2$ in an aqueous silver plating solution containing 175 g/L of silver potassium cyanide, 70 g/L of potassium cyanide and 128 mg/L of potassium selenocyanate. Furthermore, in the used silver plating solution, the concentration of Ag was 95 g/L, the concentration of KCN was 70 g/L, and the concentration of Se was 70 mg/L, so that the product of the concentration of KCN and the current density was 420 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 141, and the preferred orientation plane was {111} plane. The ratio of the X-ray diffraction peak intensity on the preferred orientation plane was 65.5%, and the full-width at half maximum of the X-ray diffraction peak on {111} plane was 0.293°.

By the same methods as those in Example 1, after the heat-proof test was carried out, the Vickers hardness Hv thereof was measured, and the crystal orientation of the silver plating film was evaluated. As a result, the Vickers hardness Hv was 144, and the preferred orientation plane was {111} plane. The ratio of the X-ray diffraction peak intensity on the preferred orientation plane was 60.9%. The full-width at half maximum of the X-ray diffraction peak on {111} plane was 0.160°. The ratio of the full-width at half maximum of the X-ray diffraction peak on {111} plane after the heat-proof test to the full-width at half maximum of the X-ray diffraction peak on {111} plane before the heat-proof test was 0.54.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.25 mΩ. The reflection density of the silver-plated product was 1.68, so that the glossiness of the silver-plated product was good. The abrasion loss of the silver plating film was 169 μm$^2$, so that the wear resistance of the silver-plated product was good. The purity of Ag was 99.9% by weight or more.

Example 8

A silver-plated product was produced by the same method as that in Example 1, except that the electroplating (silver-plating) was carried out at a liquid temperature of 15° C. and a current density of 6 A/dm$^2$ in an aqueous silver plating solution containing 175 g/L of silver potassium cyanide, 70 g/L of potassium cyanide and 128 mg/L of potassium selenocyanate. Furthermore, in the used silver plating solution, the concentration of Ag was 95 g/L, the concentration of KCN was 70 g/L, and the concentration of Se was 70 mg/L, so that the product of the concentration of KCN and the current density was 420 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 146, and the preferred orientation plane was {111} plane. The ratio of the X-ray diffraction peak intensity on the preferred orientation plane was 61.6%, and the full-width at half maximum of the X-ray diffraction peak on {111} plane was 0.257°.

By the same methods as those in Example 1, after the heat-proof test was carried out, the Vickers hardness Hv thereof was measured, and the crystal orientation of the silver plating film was evaluated. As a result, the Vickers hardness Hv was 148, and the preferred orientation plane was {111} plane. The ratio of the X-ray diffraction peak intensity on the preferred orientation plane was 65.0%. The full-width at half maximum of the X-ray diffraction peak on {111} plane was 0.234°. The ratio of the full-width at half maximum of the X-ray diffraction peak on {111} plane after the heat-proof test to the full-width at half maximum of the X-ray diffraction peak on {111} plane before the heat-proof test was 0.91.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.55 mΩ. The reflection density of the silver-plated product was 1.57, so that the glossiness of the silver-plated product was good. The abrasion loss of the silver plating film was 318 $\mu m^2$, so that the wear resistance of the silver-plated product was good. The purity of Ag was 99.9% by weight or more.

Example 9

A silver-plated product was produced by the same method as that in Example 1, except that the electroplating (silver-plating) was carried out at a liquid temperature of 15° C. and a current density of $A/dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 570 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 141, and the preferred orientation plane was {111} plane. The ratio of the X-ray diffraction peak intensity on the preferred orientation plane was 64.4%, and the full-width at half maximum of the X-ray diffraction peak on {111} plane was 0.273°.

By the same methods as those in Example 1, after the heat-proof test was carried out, the Vickers hardness Hv thereof was measured, and the crystal orientation of the silver plating film was evaluated. As a result, the Vickers hardness Hv was 145, and the preferred orientation plane was {111} plane. The ratio of the X-ray diffraction peak intensity on the preferred orientation plane was 65.8%. The full-width at half maximum of the X-ray diffraction peak on {111} plane was 0.141°. The ratio of the full-width at half maximum of the X-ray diffraction peak on {111} plane after the heat-proof test to the full-width at half maximum of the X-ray diffraction peak on {111} plane before the heat-proof test was 0.52.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.39 mΩ. The reflection density of the silver-plated product was 1.57, so that the glossiness of the silver-plated product was good. The abrasion loss of the silver plating film was 254 $\mu m^2$, so that the wear resistance of the silver-plated product was good. The purity of Ag was 99.9% by weight or more.

Example 10

A silver-plated product was produced by the same method as that in Example 1, except that the electroplating (silver-plating) was carried out at a liquid temperature of 18° C. and a current density of 6 $A/dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 570 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 141, and the preferred orientation plane was {111} plane. The ratio of the X-ray diffraction peak intensity on the preferred orientation plane was 64.4%, and the full-width at half maximum of the X-ray diffraction peak on {111} plane was 0.239°.

By the same methods as those in Example 1, after the heat-proof test was carried out, the Vickers hardness Hv thereof was measured, and the crystal orientation of the silver plating film was evaluated. As a result, the Vickers hardness Hv was 145, and the preferred orientation plane was {111} plane. The ratio of the X-ray diffraction peak intensity on the preferred orientation plane was 65.8%. The full-width at half maximum of the X-ray diffraction peak on {111} plane was 0.219°. The ratio of the full-width at half maximum of the X-ray diffraction peak on {111} plane after the heat-proof test to the full-width at half maximum of the X-ray diffraction peak on {111} plane before the heat-proof test was 0.92.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.28 mΩ. The reflection density of the silver-plated product was 1.47, so that the glossiness of the silver-plated product was good. The abrasion loss of the silver plating film was 254 $\mu m^2$, so that the wear resistance of the silver-plated product was good. The purity of Ag was 99.9% by weight or more.

Example 11

A silver-plated product was produced by the same method as that in Example 1, except that the electroplating (silver-plating) was carried out at a liquid temperature of 18° C. and a current density of 7 $A/dm^2$ in an aqueous silver plating solution containing 175 g/L of silver potassium cyanide, 70 g/L of potassium cyanide and 128 mg/L of potassium selenocyanate. Furthermore, in the used silver plating solution, the concentration of Ag was 95 g/L, the concentration of KCN was 70 g/L, and the concentration of Se was 70 mg/L, so that the product of the concentration of KCN and the current density was 490 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 143, and the preferred orientation plane was {111} plane. The ratio of the X-ray diffraction peak intensity on the preferred orientation plane was 56.9%, and the full-width at half maximum of the X-ray diffraction peak on {111} plane was 0.244°.

By the same methods as those in Example 1, after the heat-proof test was carried out, the Vickers hardness Hv thereof was measured, and the crystal orientation of the silver plating film was evaluated. As a result, the Vickers hardness Hv was 145, and the preferred orientation plane was {111} plane. The ratio of the X-ray diffraction peak intensity on the preferred orientation plane was 64.8%. The full-width at half maximum of the X-ray diffraction peak on {111} plane was 0.231°. The ratio of the full-width at half maximum of the X-ray diffraction peak on {111} plane after the heat-proof test to the full-width at half maximum of the X-ray diffraction peak on {111} plane before the heat-proof test was 0.95.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.34 mΩ. The reflection density of the silver-plated product was 1.52, so that the glossiness of the silver-plated product was good. The abrasion loss of the silver plating film was 306 $\mu m^2$, so that the wear resistance of the silver-plated product was good. The purity of Ag was 99.9% by weight or more.

Example 12

A silver-plated product was produced by the same method as that in Example 1, except that the electroplating (silver-plating) was carried out at a liquid temperature of 18° C. and a current density of 7 $A/dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 665 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 144, and the preferred orientation plane was {111} plane. The ratio of the X-ray diffraction peak intensity on the preferred orientation plane was 64.3%, and the full-width at half maximum of the X-ray diffraction peak on {111} plane was 0.265°.

By the same methods as those in Example 1, after the heat-proof test was carried out, the Vickers hardness Hv thereof was measured, and the crystal orientation of the silver plating film was evaluated. As a result, the Vickers hardness Hv was 143, and the preferred orientation plane was {111} plane. The ratio of the X-ray diffraction peak intensity on the preferred orientation plane was 65.4%. The full-width at half maximum of the X-ray diffraction peak on {111} plane was 0.154°. The ratio of the full-width at half maximum of the X-ray diffraction peak on {111} plane after the heat-proof test to the full-width at half maximum of the X-ray diffraction peak on {111} plane before the heat-proof test was 0.58.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.17 mΩ. The reflection density of the silver-plated product was 1.65, so that the glossiness of the silver-plated product was good. The abrasion loss of the silver plating film was 285 $\mu m^2$, so that the wear resistance of the silver-plated product was good. The purity of Ag was 99.9% by weight or more.

Example 13

A silver-plated product was produced by the same method as that in Example 1, except that the electroplating (silver-plating) was carried out at a liquid temperature of 21° C. and a current density of $A/dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 570 $g \cdot A/L \cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 155, and the preferred orientation plane was {111} plane. The ratio of the X-ray diffraction peak intensity on the preferred orientation plane was 41.0%, and the full-width at half maximum of the X-ray diffraction peak on {111} plane was 0.219°.

By the same methods as those in Example 1, after the heat-proof test was carried out, the Vickers hardness Hv thereof was measured, and the crystal orientation of the silver plating film was evaluated. As a result, the Vickers hardness Hv was 146, and the preferred orientation plane was {111} plane. The ratio of the X-ray diffraction peak intensity on the preferred orientation plane was 61.8%. The full-width at half maximum of the X-ray diffraction peak on {111} plane was 0.214°. The ratio of the full-width at half maximum of the X-ray diffraction peak on {111} plane after the heat-proof test to the full-width at half maximum of the X-ray diffraction peak on {111} plane before the heat-proof test was 0.98.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.18 mΩ. The reflection density of the silver-plated product was 1.37, so that the glossiness of the silver-plated product was good. The abrasion loss of the silver plating film was 247 $\mu m^2$, so that the wear resistance of the silver-plated product was good. The purity of Ag was 99.9% by weight or more.

Example 14

A silver-plated product was produced by the same method as that in Example 1, except that the electroplating (silver-plating) was carried out at a liquid temperature of 21° C. and a current density of 8 A/dm$^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 760 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 142, and the preferred orientation plane was {111} plane. The ratio of the X-ray diffraction peak intensity on the preferred orientation plane was 63.5%, and the full-width at half maximum of the X-ray diffraction peak on {111} plane was 0.255°.

By the same methods as those in Example 1, after the heat-proof test was carried out, the Vickers hardness Hv thereof was measured, and the crystal orientation of the silver plating film was evaluated. As a result, the Vickers hardness Hv was 143, and the preferred orientation plane was {111} plane. The ratio of the X-ray diffraction peak intensity on the preferred orientation plane was 66.6%. The full-width at half maximum of the X-ray diffraction peak on {111} plane was 0.191°. The ratio of the full-width at half maximum of the X-ray diffraction peak on {111} plane after the heat-proof test to the full-width at half maximum of the X-ray diffraction peak on {111} plane before the heat-proof test was 0.75.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.16 mΩ. The reflection density of the silver-plated product was 1.56, so that the glossiness of the silver-plated product was good. The abrasion loss of the silver plating film was 234 μm$^2$, so that the wear resistance of the silver-plated product was good. The purity of Ag was 99.9% by weight or more.

Example 15

A silver-plated product was produced by the same method as that in Example 1, except that the electroplating (silver-plating) was carried out at a liquid temperature of 24° C. and a current density of 6 A/dm$^2$ in an aqueous silver plating solution containing 175 g/L of silver potassium cyanide, 120 g/L of potassium cyanide and 100 mg/L of potassium selenocyanate. Furthermore, in the used silver plating solution, the concentration of Ag was 95 g/L, the concentration of KCN was 120 g/L, and the concentration of Se was 55 mg/L, so that the product of the concentration of KCN and the current density was 720 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 141, and the preferred orientation plane was {111} plane. The ratio of the X-ray diffraction peak intensity on the preferred orientation plane was 57.0%, and the full-width at half maximum of the X-ray diffraction peak on {111} plane was 0.223°.

By the same methods as those in Example 1, after the heat-proof test was carried out, the Vickers hardness Hv thereof was measured, and the crystal orientation of the silver plating film was evaluated. As a result, the Vickers hardness Hv was 139, and the preferred orientation plane was {111} plane. The ratio of the X-ray diffraction peak intensity on the preferred orientation plane was 65.2%. The full-width at half maximum of the X-ray diffraction peak on {111} plane was 0.197° The ratio of the full-width at half maximum of the X-ray diffraction peak on {111} plane after the heat-proof test to the full-width at half maximum of the X-ray diffraction peak on {111} plane before the heat-proof test was 0.88.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.38 mΩ. The reflection density of the silver-plated product was 1.44, so that the glossiness of the silver-plated product was good. The abrasion loss of the silver plating film was 350 μm$^2$, so that the wear resistance of the silver-plated product was good. The purity of Ag was 99.9% by weight or more.

Example 16

A silver-plated product was produced by the same method as that in Example 1, except that the electroplating (silver-plating) was carried out at a liquid temperature of 24° C. and a current density of 7 A/dm$^2$ in an aqueous silver plating solution containing 175 g/L of silver potassium cyanide, 120 g/L of potassium cyanide and 100 mg/L of potassium selenocyanate. Furthermore, in the used silver plating solution, the concentration of Ag was 95 g/L, the concentration of KCN was 120 g/L, and the concentration of Se was 55 mg/L, so that the product of the concentration of KCN and the current density was 840 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 142, and the preferred orientation plane was {111} plane. The ratio of the X-ray diffraction peak intensity on the preferred orientation plane was 64.1%, and the full-width at half maximum of the X-ray diffraction peak on {111} plane was 0.234°.

By the same methods as those in Example 1, after the heat-proof test was carried out, the Vickers hardness Hv thereof was measured, and the crystal orientation of the silver plating film was evaluated. As a result, the Vickers hardness Hv was 141, and the preferred orientation plane was {111} plane. The ratio of the X-ray diffraction peak intensity on the preferred orientation plane was 66.3%. The full-width at half maximum of the X-ray diffraction peak on {111} plane was 0.184°. The ratio of the full-width at half maximum of the X-ray diffraction peak on {111} plane after the heat-proof test to the full-width at half maximum of the X-ray diffraction peak on {111} plane before the heat-proof test was 0.79.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.31 mΩ. The reflection density of the silver-plated product was 1.58, so that the glossiness of the silver-plated product was good. The abrasion loss of the silver plating film was 346 μm$^2$, so that the wear resistance of the silver-plated product was good. The purity of Ag was 99.9% by weight or more.

Comparative Example 1

A silver-plated product was produced by the same method as that in Example 1, except that the electroplating (silver-plating) was carried out at a current density of 3 A/dm$^2$ in an aqueous silver plating solution containing 148 g/L of silver potassium cyanide, 70 g/L of potassium cyanide and 109 mg/L of potassium selenocyanate. Furthermore, in the used silver plating solution, the concentration of Ag was 80 g/L, the concentration of KCN was 70 g/L, and the concentration of Se was 60 mg/L, so that the product of the concentration of KCN and the current density was 210 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 112, and the preferred orientation plane was {220} plane. The ratio of the X-ray diffraction peak intensity on the preferred orientation plane was 32.9%, and the full-width at half maximum of the X-ray diffraction peak on {111} plane was 0.133°.

By the same methods as those in Example 1, after the heat-proof test was carried out, the Vickers hardness Hv thereof was measured, and the crystal orientation of the silver plating film was evaluated. As a result, the Vickers hardness Hv was 108, and the preferred orientation plane was {220} plane. The ratio of the X-ray diffraction peak intensity on the preferred orientation plane was 36.4%. The full-width at half maximum of the X-ray diffraction peak on {111} plane was 0.131°. The ratio of the full-width at half maximum of the X-ray diffraction peak on {111} plane after the heat-proof test to the full-width at half maximum of the X-ray diffraction peak on {111} plane before the heat-proof test was 0.98.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.14 mΩ. The reflection density of the silver-plated product was 0.07, so that the glossiness of the silver-plated product was not good. The abrasion loss of the silver plating film was 969 μm$^2$, so that the wear resistance of the silver-plated product was not good. The purity of Ag was 99.9% by weight or more.

Comparative Example 2

A silver-plated product was produced by the same method as that in Example 1, except that the electroplating (silver-plating) was carried out in an aqueous silver plating solution containing 148 g/L of silver potassium cyanide, 160 g/L of potassium cyanide and 109 mg/L of potassium selenocyanate. Furthermore, in the used silver plating solution, the concentration of Ag was 80 g/L, the concentration of KCN was 160 g/L, and the concentration of Se was 60 mg/L, so that the product of the concentration of KCN and the current density was 800 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 124, and the preferred orientation plane was {111} plane. The ratio of the X-ray diffraction peak intensity on the preferred orientation plane was 56.0%, and the full-width at half maximum of the X-ray diffraction peak on {111} plane was 0.345°.

By the same methods as those in Example 1, after the heat-proof test was carried out, the Vickers hardness Hv thereof was measured, and the crystal orientation of the silver plating film was evaluated. As a result, the Vickers hardness Hv was 95, and the preferred orientation plane was {111} plane. The ratio of the X-ray diffraction peak intensity on the preferred orientation plane was 75.3%. The full-width at half maximum of the X-ray diffraction peak on {111} plane was 0.091°. The ratio of the full-width at half maximum of the X-ray diffraction peak on {111} plane after the heat-proof test to the full-width at half maximum of the X-ray diffraction peak on {111} plane before the heat-proof test was 0.26.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.44 mΩ. The reflection density of the silver-plated product was 1.58, so that the glossiness of the silver-plated product was good. The abrasion loss of the silver plating film was 524 μm$^2$, so that the wear resistance of the silver-plated product was not good. The purity of Ag was 99.9% by weight or more.

Comparative Example 3

A silver-plated product was produced by the same method as that in Example 1, except that the electroplating (silver-plating) was carried out at a current density of 7 A/dm$^2$ in an aqueous silver plating solution containing 148 g/L of silver potassium cyanide, 160 g/L of potassium cyanide and 109 mg/L of potassium selenocyanate. Furthermore, in the used silver plating solution, the concentration of Ag was 80 g/L, the concentration of KCN was 160 g/L, and the concentration of Se was 60 mg/L, so that the product of the concentration of KCN and the current density was 1120 g·A/L·dm$^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 120, and the preferred orientation plane was {111} plane. The ratio of the X-ray diffraction peak intensity on the preferred orientation plane was 55.2%, and the full-width at half maximum of the X-ray diffraction peak on {111} plane was 0.365°.

By the same methods as those in Example 1, after the heat-proof test was carried out, the Vickers hardness Hv thereof was measured, and the crystal orientation of the silver plating film was evaluated. As a result, the Vickers hardness Hv was 104, and the preferred orientation plane was {111} plane. The ratio of the X-ray diffraction peak intensity on the preferred orientation plane was 84.2%. The full-width at half maximum of the X-ray diffraction peak on {111} plane was 0.090°. The ratio of the full-width at half maximum of the X-ray diffraction peak on {111} plane after the heat-proof test to the full-width at half maximum of the X-ray diffraction peak on {111} plane before the heat-proof test was 0.25.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.19 mΩ. The reflection density of the silver-plated product was 1.65, so that the glossiness of the silver-plated product was good. The abrasion loss of the silver plating film was 393 $\mu m^2$, so that the wear resistance of the silver-plated product was not good. The purity of Ag was 99.9% by weight or more.

Comparative Example 4

A silver-plated product was produced by the same method as that in Example 1, except that the electroplating (silver-plating) was carried out in an aqueous silver plating solution containing 138 g/L of silver potassium cyanide, 140 g/L of potassium cyanide and 11 mg/L of potassium selenocyanate. Furthermore, in the used silver plating solution, the concentration of Ag was 75 g/L, the concentration of KCN was 140 g/L, and the concentration of Se was 6 mg/L, so that the product of the concentration of KCN and the current density was 700 g·A/L·$dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 131, and the preferred orientation plane was {111} plane. The ratio of the X-ray diffraction peak intensity on the preferred orientation plane was 82.7%, and the full-width at half maximum of the X-ray diffraction peak on {111} plane was 0.265°.

By the same methods as those in Example 1, after the heat-proof test was carried out, the Vickers hardness Hv thereof was measured, and the crystal orientation of the silver plating film was evaluated. As a result, the Vickers hardness Hv was 84, and the preferred orientation plane was {200} plane. The ratio of the X-ray diffraction peak intensity on the preferred orientation plane was 77.3%. The full-width at half maximum of the X-ray diffraction peak on {111} plane was 0.081°. The ratio of the full-width at half maximum of the X-ray diffraction peak on {111} plane after the heat-proof test to the full-width at half maximum of the X-ray diffraction peak on {111} plane before the heat-proof test was 0.31.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.12 mΩ. The reflection density of the silver-plated product was 1.63, so that the glossiness of the silver-plated product was good. The abrasion loss of the silver plating film was 602 $\mu m^2$, so that the wear resistance of the silver-plated product was not good. The purity of Ag was 99.9% by weight or more.

Comparative Example 5

A silver-plated product was produced by the same method as that in Example 1, except that the electroplating (silver-plating) was carried out at a liquid temperature of 15° C. and a current density of 3 A/$dm^2$ in an aqueous silver plating solution containing 55 g/L of silver potassium cyanide, 150 g/L of potassium cyanide, 3 mg/L of selenium dioxide and 1794 mg/L of antimony trioxide. Furthermore, in the used silver plating solution, the concentrations of Ag, KCN, Se and Sb were 30 g/L, 150 g/L, 2 mg/L and 750 mg/L, respectively, so that the product of the concentration of KCN and the current density was 450 g·A/L·$dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 161, and the preferred orientation plane was {200} plane. The ratio of the X-ray diffraction peak intensity on the preferred orientation plane was 66.3%, and the full-width at half maximum of the X-ray diffraction peak on {111} plane was 0.375°.

By the same methods as those in Example 1, after the heat-proof test was carried out, the Vickers hardness Hv thereof was measured, and the crystal orientation of the silver plating film was evaluated. As a result, the Vickers hardness Hv was 166, and the preferred orientation plane was {200} plane. The ratio of the X-ray diffraction peak intensity on the preferred orientation plane was 68.6%. The full-width at half maximum of the X-ray diffraction peak on {111} plane was 0.350°. The ratio of the full-width at half maximum of the X-ray diffraction peak on {111} plane after the heat-proof test to the full-width at half maximum of the X-ray diffraction peak on {111} plane before the heat-proof test was 0.93.

By the same methods as those in Example 1, the contact resistance and reflection density of the silver-plated product, and the abrasion loss of the silver plating film were measured, and the purity of Ag was obtained. As a result, the contact resistance of the silver-plated product was a high value of 10.56 mΩ. The reflection density of the silver-plated product was 1.81, so that the glossiness of the silver-plated product was good. The abrasion loss of the silver plating film was 165 $\mu m^2$, so that the wear resistance of the silver-plated product was good. The purity of Ag was 98.4% by weight.

Comparative Example 6

A silver-plated product was produced by the same method as that in Example 1, except that the electroplating (silver-plating) was carried out at a liquid temperature of 12° C. and a current density of A/$dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 760 g·A/L·$dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 138, and the preferred orientation plane was {111} plane. The ratio of the X-ray diffraction peak intensity on the preferred orientation plane was 50.4%, and the full-width at half maximum of the X-ray diffraction peak on {111} plane was 0.342°.

By the same methods as those in Example 1, after the heat-proof test was carried out, the Vickers hardness Hv thereof was measured, and the crystal orientation of the silver plating film was evaluated. As a result, the Vickers hardness Hv was 95, and the preferred orientation plane was {200} plane. The ratio of the X-ray diffraction peak intensity on the preferred orientation plane was 64.3%. The full-width at half maximum of the X-ray diffraction peak on {111} plane was 0.092°. The ratio of the full-width at half maximum of the X-ray diffraction peak on {111} plane after the heat-proof test to the full-width at half maximum of the X-ray diffraction peak on {111} plane before the heat-proof test was 0.27.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.25 mΩ. The reflection density of the silver-plated product was 0.6, so that the glossiness of the silver-plated product was good. The abrasion loss of the silver plating film was 527 $\mu m^2$, so that the wear resistance of the silver-plated product was not good. The purity of Ag was 99.9% by weight or more.

Comparative Example 7

A silver-plated product was produced by the same method as that in Example 1, except that the electroplating (silver-plating) was carried out at a liquid temperature of 24° C. and a current density of 6 $A/dm^2$ in an aqueous silver plating solution containing 175 g/L of silver potassium cyanide, 70 g/L of potassium cyanide and 128 mg/L of potassium selenocyanate. Furthermore, in the used silver plating solution, the concentration of Ag was 95 g/L, the concentration of KCN was 70 g/L, and the concentration of Se was 70 mg/L, so that the product of the concentration of KCN and the current density was 420 $g\cdot A/L\cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 120, and the preferred orientation plane was {220} plane. The ratio of the X-ray diffraction peak intensity on the preferred orientation plane was 32.5%, and the full-width at half maximum of the X-ray diffraction peak on {111} plane was 0.131°.

By the same methods as those in Example 1, after the heat-proof test was carried out, the Vickers hardness Hv thereof was measured, and the crystal orientation of the silver plating film was evaluated. As a result, the Vickers hardness Hv was 109, and the preferred orientation plane was {220} plane. The ratio of the X-ray diffraction peak intensity on the preferred orientation plane was 33.1%. The full-width at half maximum of the X-ray diffraction peak on {111} plane was 0.126°. The ratio of the full-width at half maximum of the X-ray diffraction peak on {111} plane after the heat-proof test to the full-width at half maximum of the X-ray diffraction peak on {111} plane before the heat-proof test was 0.96.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.25 mΩ. The reflection density of the silver-plated product was 0.09, so that the glossiness of the silver-plated product was not good. The abrasion loss of the silver plating film was 970 $\mu m^2$, so that the wear resistance of the silver-plated product was not good. The purity of Ag was 99.9% by weight or more.

Comparative Example 8

A silver-plated product was produced by the same method as that in Example 1, except that the electroplating (silver-plating) was carried out at a liquid temperature of 24° C. and a current density of 12 $A/dm^2$ in an aqueous silver plating solution containing 175 g/L of silver potassium cyanide, 95 g/L of potassium cyanide and 100 mg/L of potassium selenocyanate. Furthermore, in the used silver plating solution, the concentration of Ag was 95 g/L, the concentration of KCN was 95 g/L, and the concentration of Se was 55 mg/L, so that the product of the concentration of KCN and the current density was 1140 $g\cdot A/L\cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 135, and the preferred orientation plane was {111} plane. The ratio of the X-ray diffraction peak intensity on the preferred orientation plane was 65.0%, and the full-width at half maximum of the X-ray diffraction peak on {111} plane was 0.294°.

By the same methods as those in Example 1, after the heat-proof test was carried out, the Vickers hardness Hv thereof was measured, and the crystal orientation of the silver plating film was evaluated. As a result, the Vickers hardness Hv was 106, and the preferred orientation plane was {111} plane. The ratio of the X-ray diffraction peak intensity on the preferred orientation plane was 64.9%. The full-width at half maximum of the X-ray diffraction peak on {111} plane was 0.090°. The ratio of the full-width at half maximum of the X-ray diffraction peak on {111} plane after the heat-proof test to the full-width at half maximum of the X-ray diffraction peak on {111} plane before the heat-proof test was 0.31.

By the same methods as those in Example 1, the contact resistance and reflection density of the silver-plated product, and the abrasion loss of the silver plating film were measured, and the purity of Ag was obtained. As a result, the contact resistance of the silver-plated product was a low value of 0.45 mΩ. The reflection density of the silver-plated product was 1.58, so that the glossiness of the silver-plated product was good. The abrasion loss of the silver plating film was 446 $\mu m^2$, so that the wear resistance of the silver-plated product was not good. The purity of Ag was 99.9% by weight or more.

Comparative Example 9

A silver-plated product was produced by the same method as that in Example 1, except that the electroplating (silver-plating) was carried out in an aqueous silver plating solution containing 147 g/L of silver potassium cyanide, 130 g/L of potassium cyanide and 73 mg/L of potassium selenocyanate. Furthermore, in the used silver plating solution, the concentration of Ag was 80 g/L, the concentration of KCN was 130 g/L, and the concentration of Se was 40 mg/L, so that the product of the concentration of KCN and the current density was 650 $g\cdot A/L\cdot dm^2$.

With respect to the silver-plated product thus obtained, the Vickers hardness Hv thereof was measured by the same method as that in Example 1, and the crystal orientation of the silver plating film was evaluated by the same method as that in Example 1. As a result, the Vickers hardness Hv was 129, and the preferred orientation plane was {111} plane. The ratio of the X-ray diffraction peak intensity on the preferred orientation plane was 44.2%, and the full-width at half maximum of the X-ray diffraction peak on {111} plane was 0.252°.

By the same methods as those in Example 1, after the heat-proof test was carried out, the Vickers hardness Hv thereof was measured, and the crystal orientation of the silver plating film was evaluated. As a result, the Vickers hardness Hv was 99, and the preferred orientation plane was {200} plane. The ratio of the X-ray diffraction peak intensity on the preferred orientation plane was 57.8%. The full-width at half maximum of the X-ray diffraction peak on {111} plane was 0.077°. The ratio of the full-width at half maximum of the X-ray diffraction peak on {111} plane after the heat-proof test to the full-width at half maximum of the X-ray diffraction peak on {111} plane before the heat-proof test was 0.31.

By the same methods as those in Example 1, the reflection density of the silver-plated product was measured, and the purity of Ag was obtained. As a result, the reflection density of the silver-plated product was 1.59, so that the glossiness of the silver-plated product was good. The purity of Ag was 99.9% by weight or more.

The producing conditions and characteristics of the silver-plated products in these examples and comparative examples are shown in Tables 1 through 3.

TABLE 1

| | Ag (g/L) | KCN (g/L) | Se (mg/L) | Sb (mg/L) | Plating Bath Temp. (° C.) | Current Density (A/dm$^2$) | KCN × Current Density |
|---|---|---|---|---|---|---|---|
| Ex. 1 | 80 | 70 | 60 | — | 18 | 5 | 350 |
| Ex. 2 | 80 | 130 | 60 | — | 18 | 3 | 390 |
| Ex. 3 | 80 | 160 | 60 | — | 18 | 3 | 480 |
| Ex. 4 | 95 | 80 | 60 | — | 18 | 5 | 400 |
| Ex. 5 | 110 | 80 | 60 | — | 18 | 5 | 400 |
| Ex. 6 | 95 | 70 | 70 | — | 12 | 4 | 280 |
| Ex. 7 | 95 | 70 | 70 | — | 12 | 6 | 420 |
| Ex. 8 | 95 | 70 | 70 | — | 15 | 6 | 420 |
| Ex. 9 | 95 | 95 | 55 | — | 15 | 6 | 570 |
| Ex. 10 | 95 | 95 | 55 | — | 18 | 6 | 570 |
| Ex. 11 | 95 | 70 | 70 | — | 18 | 7 | 490 |
| Ex. 12 | 95 | 95 | 55 | — | 18 | 7 | 665 |
| Ex. 13 | 95 | 95 | 55 | — | 21 | 6 | 570 |
| Ex. 14 | 95 | 95 | 55 | — | 21 | 8 | 760 |
| Ex. 15 | 95 | 120 | 55 | — | 24 | 6 | 720 |
| Ex. 16 | 95 | 120 | 55 | — | 24 | 7 | 840 |
| Comp. 1 | 80 | 70 | 60 | — | 18 | 3 | 210 |
| Comp. 2 | 80 | 160 | 60 | — | 18 | 5 | 800 |
| Comp. 3 | 80 | 160 | 60 | — | 18 | 7 | 1120 |
| Comp. 4 | 75 | 140 | 6 | — | 18 | 5 | 700 |
| Comp. 5 | 30 | 150 | 2 | 750 | 15 | 3 | 450 |
| Comp. 6 | 95 | 95 | 55 | — | 12 | 8 | 760 |
| Comp. 7 | 95 | 70 | 70 | — | 24 | 6 | 420 |
| Comp. 8 | 95 | 95 | 55 | — | 24 | 12 | 1140 |
| Comp. 9 | 80 | 130 | 40 | — | 18 | 5 | 650 |

TABLE 2

| | Before Heat-Proof Test | | | |
|---|---|---|---|---|
| | Hardness (Hv) | Preferred Orientation Plane | Ratio of Peak Intensity on Preferred Orientation Plane (%) | Full-Width at Half Maximum on {111} Plane (deg) |
| Ex. 1 | 132 | {111} | 55.0 | 0.259 |
| Ex. 2 | 126 | {111} | 60.6 | 0.260 |
| Ex. 3 | 129 | {111} | 59.9 | 0.284 |
| Ex. 4 | 131 | {111} | 63.7 | 0.269 |
| Ex. 5 | 130 | {111} | 43.6 | 0.231 |
| Ex. 6 | 138 | {111} | 61.7 | 0.264 |
| Ex. 7 | 141 | {111} | 65.5 | 0.293 |
| Ex. 8 | 146 | {111} | 61.6 | 0.257 |
| Ex. 9 | 141 | {111} | 64.4 | 0.273 |
| Ex. 10 | 141 | {111} | 64.4 | 0.239 |
| Ex. 11 | 143 | {111} | 56.9 | 0.244 |
| Ex. 12 | 144 | {111} | 64.3 | 0.265 |
| Ex. 13 | 155 | {111} | 41.0 | 0.219 |
| Ex. 14 | 142 | {111} | 63.5 | 0.255 |
| Ex. 15 | 141 | {111} | 57.0 | 0.223 |
| Ex. 16 | 142 | {111} | 64.1 | 0.234 |
| Comp. 1 | 112 | {220} | 32.9 | 0.133 |
| Comp. 2 | 124 | {111} | 56.0 | 0.345 |
| Comp. 3 | 120 | {111} | 55.2 | 0.365 |
| Comp. 4 | 131 | {111} | 82.7 | 0.265 |
| Comp. 5 | 161 | {200} | 66.3 | 0.375 |
| Comp. 6 | 138 | {111} | 50.4 | 0.342 |
| Comp. 7 | 120 | {220} | 32.5 | 0.131 |
| Comp. 8 | 135 | {111} | 65.0 | 0.294 |
| Comp. 9 | 129 | {111} | 44.2 | 0.252 |

TABLE 2-continued

| | After Heat-Proof Test | | | | |
|---|---|---|---|---|---|
| | Hardness (Hv) | Preferred Orientation Plane | Ratio of Peak Intensity on Preferred Orientation Plane (%) | Full-Width at Half Maximum on {111} Plane (deg) | Ratio of Full-Width at Half Maximum |
| Ex. 1 | 140 | {111} | 55.8 | 0.217 | 0.84 |
| Ex. 2 | 132 | {111} | 60.7 | 0.217 | 0.83 |
| Ex. 3 | 129 | {111} | 61.5 | 0.231 | 0.81 |
| Ex. 4 | 134 | {111} | 63.6 | 0.232 | 0.86 |
| Ex. 5 | 135 | {111} | 40.4 | 0.203 | 0.88 |
| Ex. 6 | 145 | {111} | 64.5 | 0.236 | 0.90 |
| Ex. 7 | 144 | {111} | 60.9 | 0.160 | 0.54 |
| Ex. 8 | 148 | {111} | 65.0 | 0.234 | 0.91 |
| Ex. 9 | 145 | {111} | 65.8 | 0.141 | 0.52 |
| Ex. 10 | 145 | {111} | 65.8 | 0.219 | 0.92 |
| Ex. 11 | 145 | {111} | 64.8 | 0.231 | 0.95 |
| Ex. 12 | 143 | {111} | 65.4 | 0.154 | 0.58 |
| Ex. 13 | 146 | {111} | 61.8 | 0.214 | 0.98 |
| Ex. 14 | 143 | {111} | 66.6 | 0.191 | 0.75 |
| Ex. 15 | 139 | {111} | 65.2 | 0.197 | 0.88 |
| Ex. 16 | 141 | {111} | 66.3 | 0.184 | 0.79 |
| Comp. 1 | 108 | {220} | 36.4 | 0.131 | 0.98 |
| Comp. 2 | 95 | {111} | 75.3 | 0.091 | 0.26 |
| Comp. 3 | 104 | {111} | 84.2 | 0.090 | 0.25 |
| Comp. 4 | 84 | {200} | 77.3 | 0.081 | 0.31 |
| Comp. 5 | 166 | {200} | 68.6 | 0.350 | 0.93 |
| Comp. 6 | 95 | {200} | 64.3 | 0.092 | 0.27 |
| Comp. 7 | 109 | {220} | 33.1 | 0.126 | 0.96 |
| Comp. 8 | 106 | {111} | 64.9 | 0.090 | 0.31 |
| Comp. 9 | 99 | {200} | 57.8 | 0.077 | 0.31 |

TABLE 3

| | Contact Resistance (mΩ) | Reflection Density | Abrasion Loss after Sliding Test (μm²) | Purity of Ag (wt %) |
|---|---|---|---|---|
| Ex. 1 | 0.24 | 1.69 | 260 | 99.9 or more |
| Ex. 2 | 0.05 | 1.54 | 309 | 99.9 or more |
| Ex. 3 | 0.18 | 1.36 | 250 | 99.9 or more |
| Ex. 4 | 0.19 | 1.36 | 309 | 99.9 or more |
| Ex. 5 | 0.06 | 1.56 | 251 | 99.9 or more |
| Ex. 6 | 0.51 | 1.45 | 166 | 99.9 or more |
| Ex. 7 | 0.25 | 1.68 | 169 | 99.9 or more |
| Ex. 8 | 0.55 | 1.57 | 318 | 99.9 or more |
| Ex. 9 | 0.39 | 1.57 | 254 | 99.9 or more |
| Ex. 10 | 0.28 | 1.47 | 254 | 99.9 or more |
| Ex. 11 | 0.34 | 1.52 | 306 | 99.9 or more |
| Ex. 12 | 0.17 | 1.65 | 285 | 99.9 or more |
| Ex. 13 | 0.18 | 1.37 | 247 | 99.9 or more |
| Ex. 14 | 0.16 | 1.56 | 234 | 99.9 or more |
| Ex. 15 | 0.38 | 1.44 | 350 | 99.9 or more |
| Ex. 16 | 0.31 | 1.58 | 346 | 99.9 or more |
| Comp. 1 | 0.14 | 0.07 | 969 | 99.9 or more |
| Comp. 2 | 0.44 | 1.58 | 524 | 99.9 or more |
| Comp. 3 | 0.19 | 1.65 | 393 | 99.9 or more |
| Comp. 4 | 0.12 | 1.63 | 602 | 99.9 or more |
| Comp. 5 | 10.56 | 1.81 | 165 | 98.4 |
| Comp. 6 | 0.25 | 0.6 | 527 | 99.9 or more |
| Comp. 7 | 0.25 | 0.09 | 970 | 99.9 or more |
| Comp. 8 | 0.45 | 1.58 | 446 | 99.9 or more |
| Comp. 9 | — | 1.59 | — | 99.9 or more |

As can be seen from Tables 1 through 3, in the silver-plated products in Examples 1-16 wherein the preferred orientation plane of the surface layer is {111} plan and wherein the ratio of the full-width at half maximum of the X-ray diffraction peak on {111} plane after heating the silver-plated product at 50° C. for 168 hours to the full-width at half maximum of the X-ray diffraction peak on {111} plane before the heating of the silver-plated product is not less than 0.5, it is possible to prevent the increase of the contact resistance thereof while maintaining the high hardness thereof.

FIG. 1 shows the relationship between a liquid temperature and the product of the concentration of potassium cyanide in a silver plating solution and a current density when each of the silver-plated products in Examples 1-16 and Comparative Examples 1-3 and 6-8 is produced in the silver plating solution which contains 80 to 110 g/L of silver, 70 to 160 g/L of potassium cyanide and 55 to 70 mg/L of selenium. As shown in FIG. 1, in Examples 1-16, there is obtained the expression y=34.3x−97.688 as the relationship between y and x by the least-square method assuming that (Concentration of KCN×Current Density) is y and (Liquid Temperature) is x. Therefore, if the relationship between (Concentration of KCN×Current Density) y and (Liquid Temperature) x is within a range between y=34.3x−267 and y=34.3x+55, i.e., with in a range of (34.3x−267)≤y≤(34.3x+55), it is possible to produce the silver-plated products in Examples 1-16 wherein the preferred orientation plane of the surface layer is {111} plan and wherein the ratio of the full-width at half maximum of the X-ray diffraction peak on {111} plane after heating the silver-plated product at 50° C. for 168 hours to the full-width at half maximum of the X-ray diffraction peak on {111} plane before the heating of the silver-plated product is not less than 0.5.

The invention claimed is:

1. A silver-plated product comprising:

a base material; and a surface layer of silver having a purity of 99.9% or more, the surface layer being formed on the base material, wherein the surface layer has a preferred orientation plane which is {111} plane, and a ratio of the full-width at half maximum of an X-ray diffraction peak on {111} plane after heating the silver-plated product at 50° C. for 168 hours to the full-width at half maximum of an X-ray diffraction peak on {111} plane before the heating of the silver-plated product is not less than 0.5.

2. The silver-plated product as set forth in claim 1, which has a reflection density of not less than 1.0.

3. The silver-plated product as set forth in claim 1, which has a Vickers hardness Hv of not less than 100.

4. The silver-plated product as set forth in claim 1, which has a Vickers hardness Hv of not less than 100 after heating the silver-plated product at 50° C. for 168 hours.

5. The silver-plated product as set forth in claim 1, wherein said base material is made of copper or a copper alloy.

6. The silver-plated product as set forth in claim 1, wherein an underlying layer of nickel is formed between said base material and said surface layer.

7. The silver-plated product as set forth in claim 1, wherein the silver-plated product is an electrical contact.

8. The silver-plated product as set forth in claim 1, wherein the silver-plated product is an electrical terminal part.

* * * * *